United States Patent [19]

Swartzendruber

[11] Patent Number: 5,263,449
[45] Date of Patent: Nov. 23, 1993

[54] THROTTLE CAM

[75] Inventor: Ray E. Swartzendruber, Okemos, Mich.

[73] Assignee: General Motors Corporation, Detroit, Mich.

[21] Appl. No.: 915,439

[22] Filed: Jul. 17, 1992

[51] Int. Cl.$^5$ .................... F02D 11/04; F16C 1/10
[52] U.S. Cl. .................... 123/400; 74/502.6; 251/294
[58] Field of Search ............ 123/352, 361, 396, 399, 123/400; 251/294; 74/500.5, 502.4, 502.6, 513

[56] References Cited

U.S. PATENT DOCUMENTS

| 4,703,823 | 11/1987 | Yogo et al. | 180/197 |
| 4,714,864 | 12/1987 | Yogo et al. | 318/52 |
| 4,747,380 | 5/1988 | Ejiri et al. | 123/399 |
| 4,776,563 | 10/1988 | Pascall | 251/129.03 |
| 5,165,298 | 11/1992 | Shier et al. | 123/396 X |

OTHER PUBLICATIONS

Exhibit C–copy of photograph of throttle cam from 1990 Subaru Legacy vehicle. (no date).
Exhibit D–copy of photograph of throttle cam from 1987 Nissan vehicle. (no date).
AC Rochester Division, General Motors Corporation; "1989 New Product Information"; Publication No. 9D-1989; pp. 1, 23, 25, 27. Copyright 1988.

Primary Examiner—Tony M. Argenbright
Attorney, Agent, or Firm—Karl F. Barr, Jr.

[57] ABSTRACT

A throttle cam for a throttle valve comprises a throttle cam for a throttle valve with the throttle cam comprising a cam body having a shaft opening with an opening axis. The throttle cam further comprises a trough-shaped cable track adjoining the cam body. The cable track comprises a track bottom having one end adjacent to cable connection openings, and a pair of track walls separated by the track bottom. The track walls extend away from an opening axis and lie in a radial plane so that, when the cam body is in a closed position, the throttle cable is received in the track bottom, and when the cam body is sufficiently rotated away from the closed position, a portion of the throttle cable is displaced away from the track bottom in the radial plane. The cable track further comprises a cam clip adjoining one of the track walls to obstruct displacement of the throttle cable beyond the track walls when the cam body is rotated away from the closed position.

4 Claims, 2 Drawing Sheets

THROTTLE CAM

TECHNICAL FIELD

This invention relates to a throttle cam which is mounted on a valve shaft of a throttle valve, and more particularly to a throttle cam having a cam clip which obstructs removal of a throttle cable from the cable track in the throttle cam when the throttle cable is unwound from the throttle cam.

BACKGROUND

A throttle valve can include a valve member disposed in a valve housing and a throttle shaft extending through the housing on which the valve member is mounted. Rotation of the throttle shaft causes variation in the flow area around the valve member. A throttle cam can be mounted on an end of the throttle shaft outside the valve housing so that the throttle cam can rotate between a closed position wherein the flow area around the valve member is minimum and open positions wherein the flow area is increased. A throttle cable can be connected to the throttle cam so that when a tensile force is applied to the throttle cable, the throttle cam rotates away from the closed position to an open position. A return spring can be connected to the throttle shaft so that, when the tensile force decreases, the return spring urges the throttle cam to rotate toward the closed position.

The throttle cam can have a cable track in which the throttle cable is seated when the throttle cam is in the closed position. When the throttle cam rotates away from the closed position to an open position, the throttle cable unwinds from the cable track. If the rotation is sufficient, a portion of the throttle cable in the cable track can radially displace a sufficient amount away from the cable track so that it completely exits the cable track. When the throttle cam rotates to return to the closed position, seating of the throttle cable in the cable track may be obstructed if the throttle cable is offset from the plane of the cable track just before to its entry therein.

SUMMARY OF THE INVENTION

The present invention provides a throttle cam for a throttle valve with the throttle cam comprising a cam body having a shaft opening with an opening axis. The shaft opening enables extension of a throttle shaft through it so that rotation of the cam body between closed and open positions about the shaft opening causes concomitant rotation of the throttle shaft. A cable connection means adjoins the cam body. The cable connection means is adapted for connection of a throttle cable thereto so that, application of a tensile force to the throttle cable in a direction which does not intersect the opening axis causes rotation of the cam body toward at least one of the open positions. The throttle valve has a return means which, when the cam body is in one of the open positions and the tensile force is reduced, urges the cam body to rotate toward the closed position.

The throttle cam further comprises a trough-shaped cable track adjoining the cam body. The cable track comprises a track bottom having one end adjacent to the cable connection means, and a pair of track walls separated by the track bottom. The track walls extend away from the opening axis and lie in the radial plane so that, when the cam body is in a closed position, the throttle cable is received in the track bottom, and when the cam body is sufficiently rotated away from the closed position, a portion of the throttle cable is displaced away from the track bottom in the radial plane.

The cable track further comprises a cam clip adjoining one of the track walls to obstruct displacement of the throttle cable beyond the track walls when the cam body is rotated away from the closed position. The portion of the throttle cable between the cable connection means and cam clip is thereby obstructed from exiting the cable track. This facilitates seating of the throttle cable in the cable track when the throttle shaft returns to the closed position.

These and other features and advantages of the invention will be more fully understood from the following description of certain specific embodiments of the invention taken together with the accompanying drawings.

BRIEF DRAWING DESCRIPTION

In the drawings.

Corresponding reference characters indicate corresponding parts throughout the several views of the drawings.

DETAILED DESCRIPTION

Figure 1:
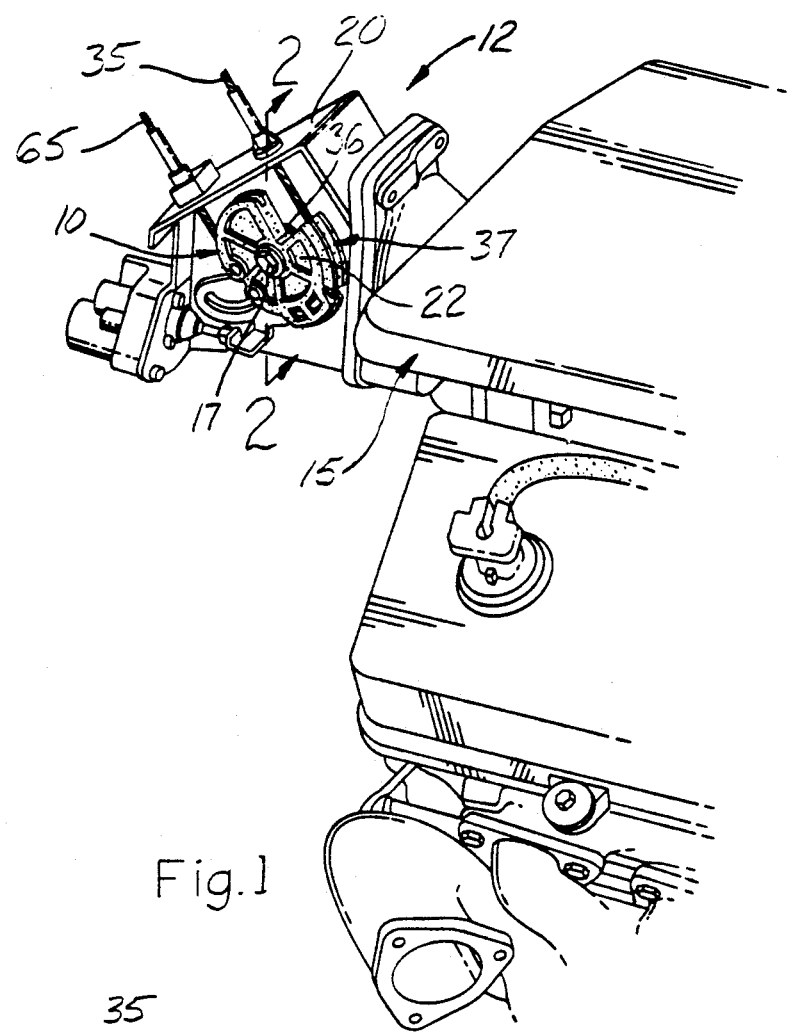
FIG. 1 is a perspective view of the throttle cam of the present invention mounted on a throttle valve of an engine with the throttle cable received in the cable track.

Referring to the drawings, and in particular, FIG. 1, numeral 10 generally refers to a throttle cam for a throttle valve 12 of an engine 15. The throttle valve 12 includes a throttle shaft 17 which is rotatably mounted in a throttle body 20 and a valve member comprising a butterfly blade which is fixed to the throttle shaft. Rotation of the throttle shaft 17 varies the flow area around the valve member which facilitates control of the flow through the throttle body 20.

Figure 2:
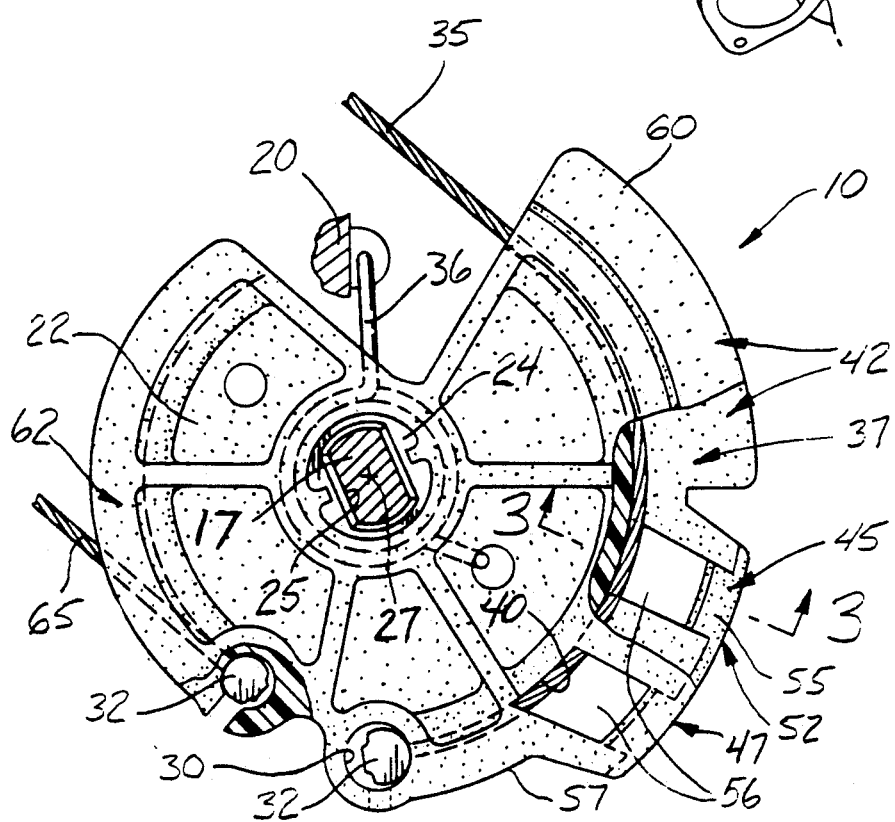
FIG. 2 is an enlarged side view of the throttle cam generally in the plane indicated by line 2—2 of FIG. 1 showing the cam clip formed in the throttle cam.

As shown in FIGS. 1 and 2, the throttle cam 10 comprises a cam body 22 having a lobe shape and is formed of a rigid plastic material having a metallic insert 24. The metallic insert 24 has a rectangular passage which defines a shaft opening 25 with an opening axis 27. The shaft opening 25 has a rectangular cross section through which the end of the throttle shaft 17 having a similarly shaped cross section extends. The throttle shaft 17 tightly fits in the shaft opening 25 so that rotation of the cam body 22 about the shaft opening 25 produces concomitant rotation of the throttle shaft 17 and the valve member mounted thereon.

The throttle cam 10 further comprises a cable connection means constituted by pair of coaxial cable connection openings 30 formed in the cam body 22. The cable connection openings 30 are adapted for connection of a cylindrical cable anchor 32 of a throttle cable 35 thereto by insertion of opposite ends of the cable anchor into the cable connection openings.

The throttle cable 35 is typically coupled to the accelerator pedal so that depression of the accelerator pedal by the driver's foot causes a tensile force to be applied to the throttle cable. The portion of the throttle cable 35 adjoining the cable anchor 32 is oriented in a direction which does not intersect the opening axis 27. This results in the tensile force causing rotation of the cam body 22 about the shaft opening 25 away from the closed position toward an open position. This causes the throttle shaft 17 and valve member to rotate thereby increasing the flow area around the valve member.

When the depressive force of the driver's foot is reduced, the tensile force on the throttle cable 35 is concomitantly reduced. The throttle valve 12 has a return means comprising a return spring 36 connected between the throttle and cam bodies 20, 22. The return spring 36 urges the cam body 22 to rotate toward the closed position This causes the throttle shaft 17 and valve member to rotate thereby decreasing the flow area around the valve member.

Figure 3:
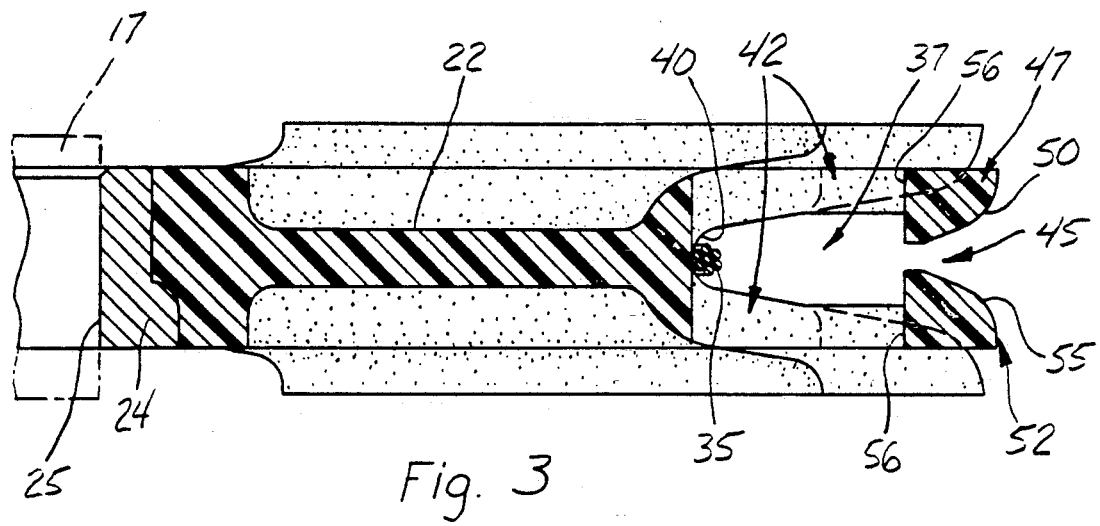
FIG. 3 is an enlarged cross sectional view of the cam clip generally in the plane indicated by line 3—3 of FIG. 2 showing the cable track, molding window and clip tangs.

As shown in FIG. 3, the throttle cam 10 further comprises a trough-shaped cable track 37 formed in the cam body 22. The cable track 37 comprises a track bottom 40 having one end adjacent to the cable connection openings 30. The cable track 37 further comprises a pair of track walls 42 separated by the track bottom 40. The track walls 42 extend away from the opening axis 27 and lie in a radial plane through the opening axis 27. The extension of the track walls 42 away from the opening axis 27 and the location of the track walls in a radial plane through the opening axis results in the throttle cable 35 being received in the track bottom 40, as shown in FIGS. 2 and 3, when the throttle shaft 17 is in the closed position.

The cable track 37 comprises a cam clip 45 adjoining one of the track walls 42. The cam clip 45 is spaced away from the cable connection openings 30 and away from the track bottom. The cam clip 45 comprises a first clip tang 47 which extends away from one of the track walls 42 toward the other track wall. The other track wall 42 has a second clip tang 52 which extends toward the end of the first clip tang 47. The first and second clip tangs 47, 2 each have a sufficient length so that the minimum distance between their ends is less than the thickness of the throttle cable 35.

The first and second clip tangs 47, 52 have first and second tang surfaces 50, 55 which face the top of the track walls 42. The first tang surface 50 is chamfered so that the thickness of the first clip tang 47 decreases in a direction toward the other track wall 42. The second tang surface 55 is chamfered so that the thickness of the second clip tang 52 decreases in a direction toward the first clip tang 47. The track walls 42 have windows 56 which allow removal of mold cores used to form the first and second clip tangs 47, 52.

The cable track 37 is sufficiently resilient to allow the minimum distance between the first and second clip tangs 47, 52 to be increased. This, in combination with the chamfer of the first and second tang surfaces 50, 55, facilitate passage of the throttle cable 35 between the first and second clip tangs 47, 52 into the region between the cam clip 45 and track bottom 40. The formation of the first and second clip tangs 47, 52 on the inner surfaces of the track walls 42 also facilitates insertion of the throttle cable 35 into the cable track 37 since during such insertion, the throttle cable remains in a single radial plane through the opening axis 27.

Figure 4:
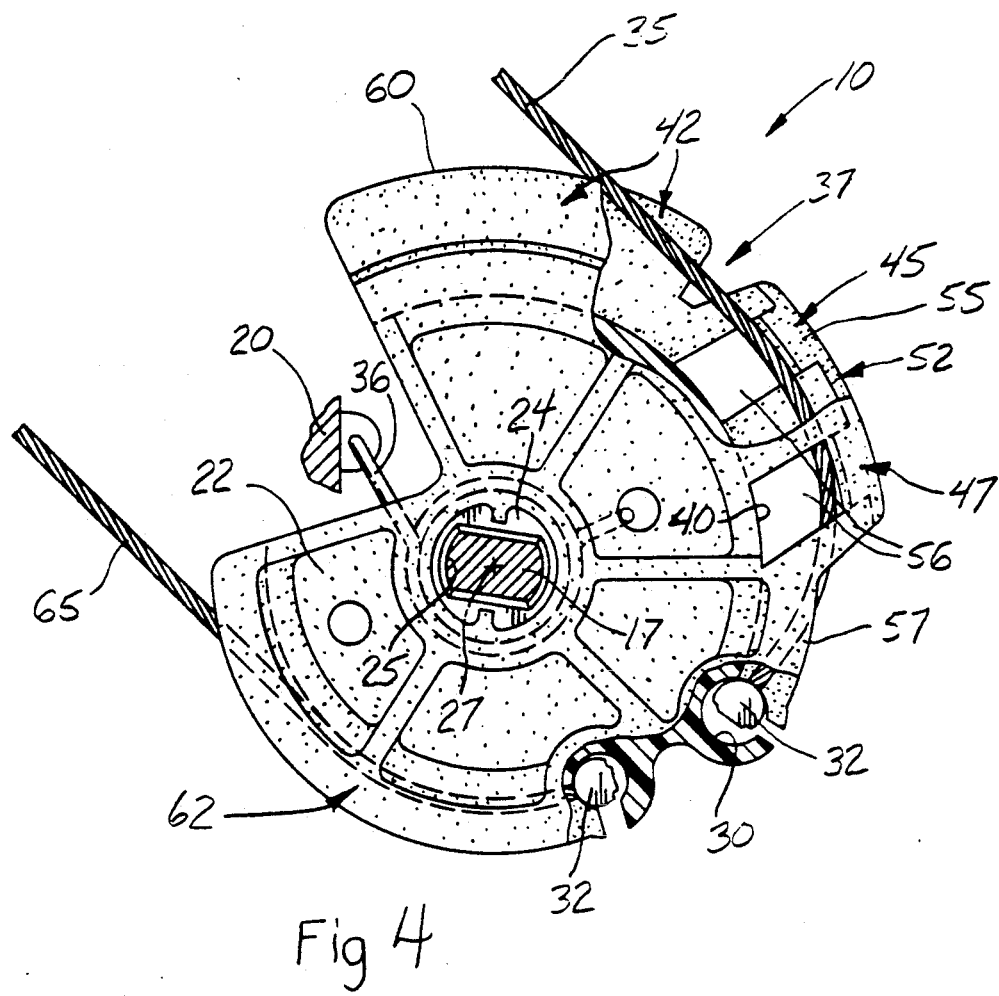
FIG. 4 is a side view of the throttle cam showing the throttle cable wound around the cable track and unwound from the cable track with the cam clip obstructing displacement of the throttle cable beyond the track walls.

When the throttle shaft 17 is sufficiently rotated away from the closed position, a portion of the throttle cable 35 is displaced away from the track bottom 40 in the radial plane, as shown FIG. 4. The limited distance between the ends of the first and second clip tangs 47, 52 obstructs displacement of the throttle cable 35 beyond the track walls 42 when the cam body 22 is rotated away from the closed position. The spacing of the cam clip 45 away from the cable connection openings 30 allows a predetermined displacement of the throttle cable 35 away from the track bottom 40, as shown in FIG. 4. Obstructing displacement of the throttle cable 35 beyond the track walls 42 facilitates seating of the throttle cable 35 in the cable track 37 when the throttle shaft 17 returns to the closed position.

The obstruction provided by the first and second clip tangs 47, 52 greatly limits the displacement of the portion of the throttle cable 35, between the cam clip 45 and the cable connection openings 30, away from the track bottom 40. This allows the height of the portion 57 of the track walls 42 between the cable connection openings 30 and cam clip 45 to be less than the height of the portion 60 of the track walls 42 on the other side of the cam clip 45. Reducing the height of the portion 57 of the track walls 42 reduces material quantity required for the track walls 42 and facilitates location of the throttle cam 10 in the congested area around the throttle body 20.

The throttle cam 10 may have a second cable track 62 in which is seated a cable 65 which extends to the transmission. The cable 65 is always under tension thereby making structures like the first and second clip tangs 47, 52 unnecessary.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A throttle cam for a throttle valve, said throttle cam comprising:
   a cam body having a shaft opening with an opening axis, said shaft opening enabling extension of a throttle shaft through it so that rotation of said cam body between closed and open positions about said shaft opening causes concomitant rotation of the throttle shaft;
   a cable connection means adjoining said cam body, said cable connection means being adapted for connection of a throttle cable thereto so that application of a tensile force to the throttle cable in a direction which does not intersect said opening axis causes rotation of said cam body toward at least one of the open positions,
   the throttle valve having a return means which, when said cam body is in one of the open positions and said tensile force is reduced, urges the cam body to rotate toward the closed position;
   a trough-shaped cable track adjoining said cam body, said cable track comprising a track bottom having one end adjacent to said cable connection means, a pair of track walls separated by said track bottom, said track walls extending away from said opening axis and lying in a radial plane so that, when said cam body is in a closed position, the throttle cable is received in said track bottom, and when said cam body is sufficiently rotated away from the closed position, a portion of the throttle cable is displaced away from said track bottom in said radial plane, and a cam clip adjoining one of said track walls to obstruct displacement of the throttle cable beyond said track walls when said cam body is rotated away from the closed position, wherein said cam clip extends away from one of said track walls toward the other of said track walls, said cam clip having a sufficient length so that the minimum distance between the end of said cam clip and said other track wall is less than the thickness of the throttle cable enabling said obstruction of removal of the throttle cable beyond said track walls, said cable track being sufficiently resilient to allow said minimum distance to be increased enabling passage of the throttle cable between said cam clip and said other track wall into the region between said cam clip and track bottom.

2. A throttle cam as set forth in claim 1 wherein said cam clip comprises a first clip tang having a first tang surface which faces the top of said track walls, said first tang surface being chambered so that the thickness of said first clip tang decreases in a direction toward said other track wall, said first tang surface facilitating said passage of the throttle cable between said first clip tang and track wall into the region between said cam clip and track bottom.

3. A throttle cam as set forth in claim 2 wherein said other track wall has a second clip tang extending therefrom toward the end of said first clip tang, said second clip tang having a second tang surface which faces the top of said track walls, said second tang surface being chamfered so that the thickness of said second clip tang decreases in a direction toward said first clip tang, said first and second tang surfaces facilitating passage of the throttle cable between said first and second clip tangs into the region between said cam clip and track bottom.

4. A throttle cam as set forth in claim 1 wherein the height of the portion of said track walls between said cable connection means and cam clip is less than the height of the portion of said track walls on the other side of said cam clip.

* * * * *